(12) United States Patent
Cardone

(10) Patent No.: US 8,104,532 B2
(45) Date of Patent: Jan. 31, 2012

(54) SHOWER HEAT EXCHANGER WITH CLOG-REMOVABLE DRAIN

(76) Inventor: Jeremiah Cardone, Wantagh, NY (US)

( * ) Notice: Subject to any disclaimer, the term of this patent is extended or adjusted under 35 U.S.C. 154(b) by 0 days.

(21) Appl. No.: 12/982,797

(22) Filed: Dec. 30, 2010

(65) Prior Publication Data

US 2011/0094708 A1  Apr. 28, 2011

Related U.S. Application Data

(60) Provisional application No. 61/341,195, filed on Mar. 29, 2010.

(51) Int. Cl.
*F24D 3/16* (2006.01)

(52) U.S. Cl. ............. 165/56; 165/48.1; 165/53; 165/66; 4/545; 4/598

(58) Field of Classification Search .............. 4/545, 598; 165/47, 48.1, 53, 56, 58, 65, 66
See application file for complete search history.

(56) References Cited

U.S. PATENT DOCUMENTS

| | | |
|---|---|---|
| 4,304,292 A | 12/1981 | Cardone et al. |
| 4,372,372 A | 2/1983 | Hunter |
| 4,619,311 A | 10/1986 | Vasile et al. |
| 4,821,793 A | 4/1989 | Sheffield |
| 5,791,401 A | 8/1998 | Nobile |

OTHER PUBLICATIONS

U.S. Green Building Council, LEED for Homes Pilot, Revised Energy & Atmosphere Measures for California, May 2007, 12 pages.
Uniform Plumbing Code, Chapter 7, Sanitary Drainage, Section 710.3.2 and 710.3.3. 2006, 11 pages.

*Primary Examiner* — Judy Swann
*Assistant Examiner* — Thomas Y Ho
(74) *Attorney, Agent, or Firm* — Alfred M. Walker; Myron Amer

(57) ABSTRACT

A heat exchanger placed underneath an elevated tub or shower stall or under the bathroom floor includes a flat top heat conductive plate. The top plate is fastened to a flat lower plate, having a serpentine pattern with a shallow depth embedded into the top surface. When the top plate is fastened and sealed to the lower plate, the flow of the incoming cold water is contained within the confines of the serpentine lower plate of the heat exchanger. Heat is transferred from the grey waste water falling onto the top plate to preheat the incoming cold water flowing underneath the top plate in the serpentine conduit chamber of the lower plate in contact with a bottom surface of the top plate. The cold water is thereby preheated and used as a substitute for the incoming cold water that would be normally plumbed to the discharge shower head.

17 Claims, 14 Drawing Sheets

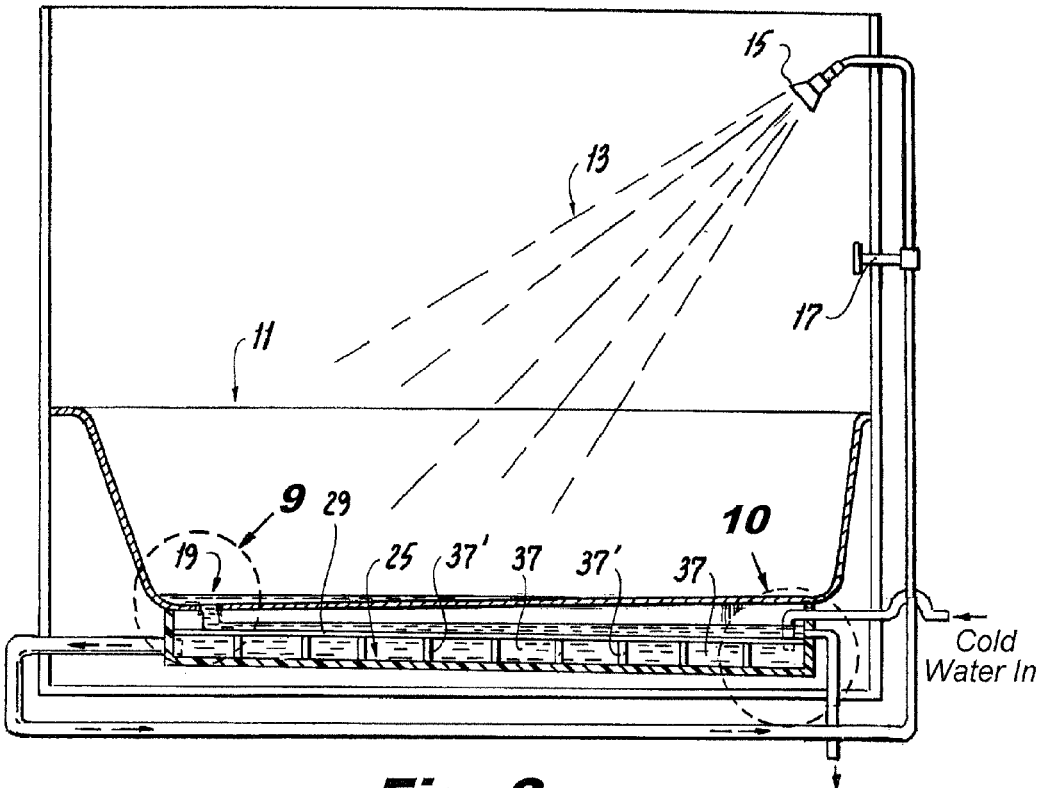
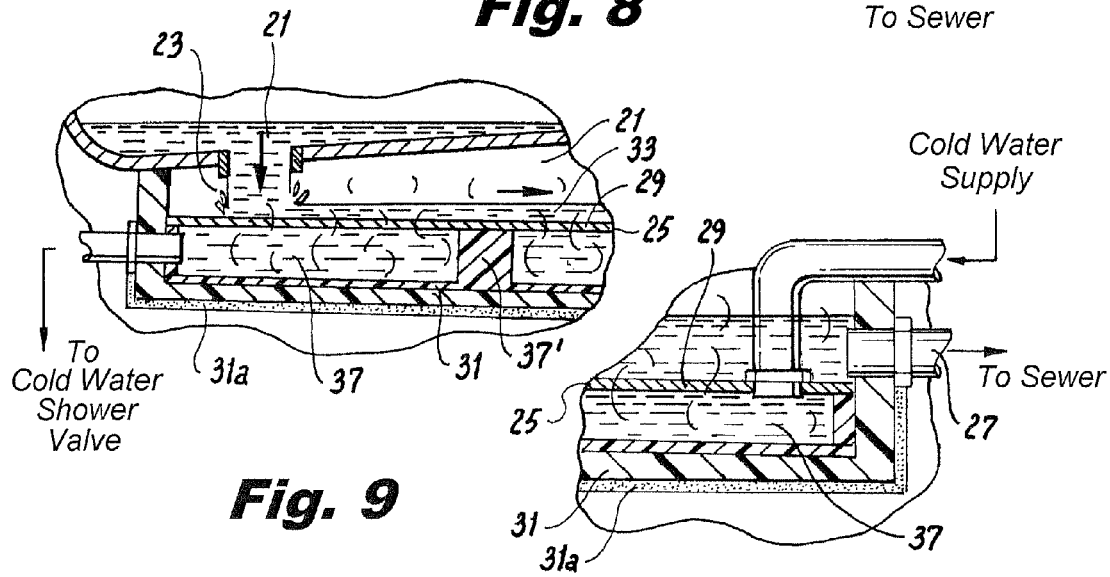
Fig. 8
Fig. 9
Fig. 10

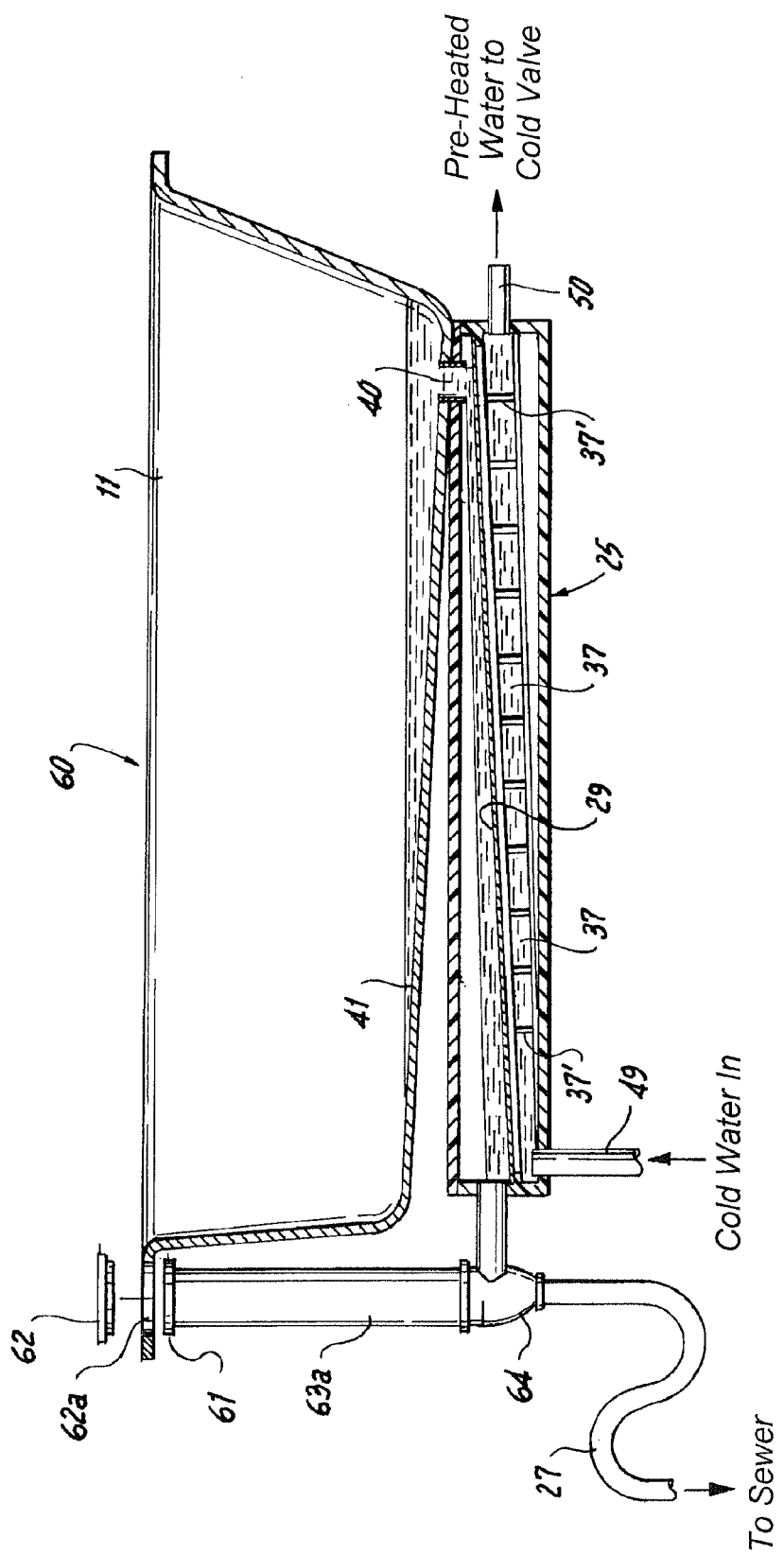

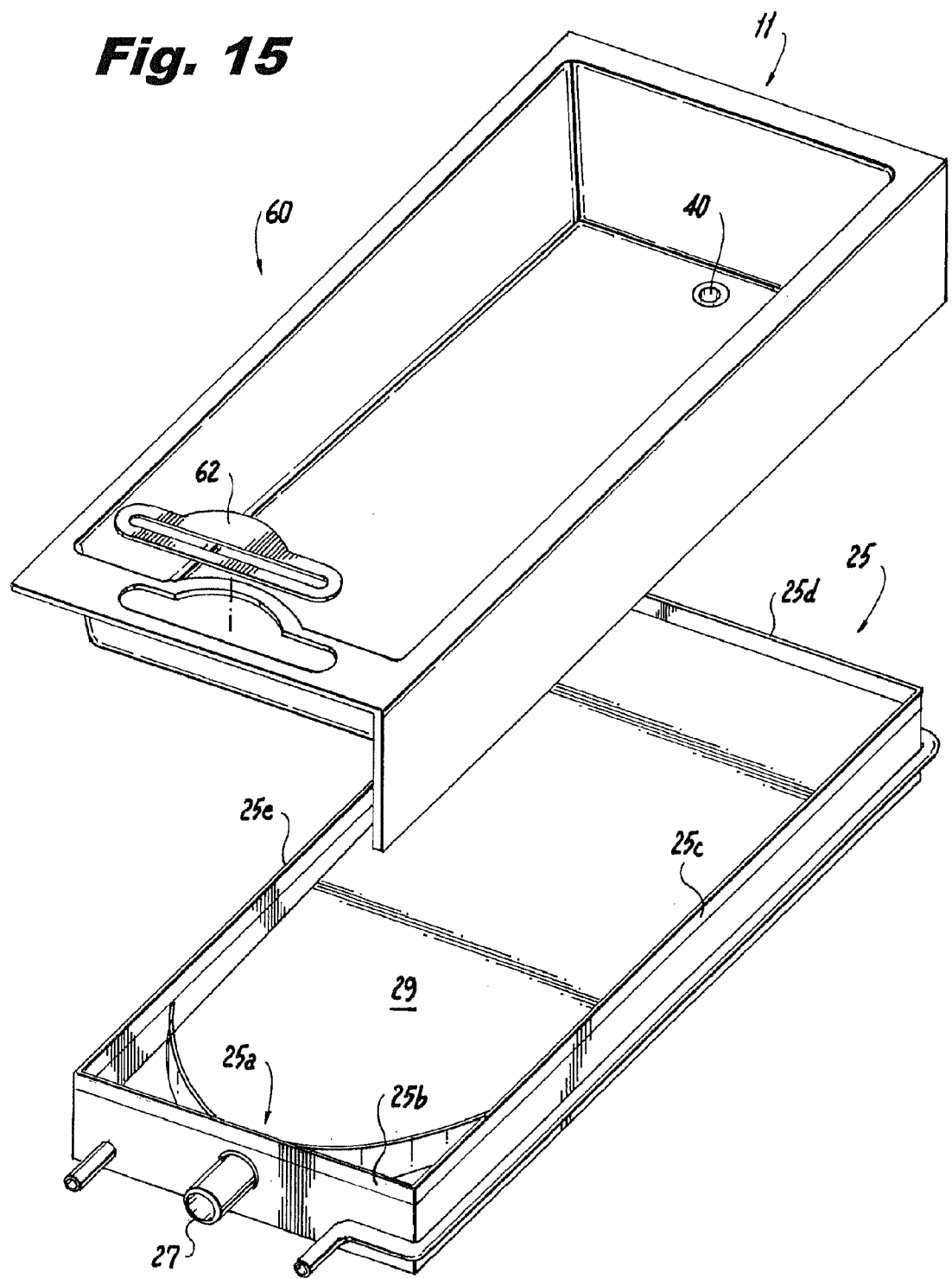

SHOWER HEAT EXCHANGER WITH CLOG-REMOVABLE DRAIN

RELATED APPLICATIONS

This application claims priority and benefit under 35 U.S.C. 119(e) from provisional Application No. 61/341,195 filed Mar. 29, 2010, the entire disclosure of which is incorporated by reference herein.

BACKGROUND OF THE INVENTION

Many ways of recovering some of the heat in the grey waste water of a shower to preheat the incoming cold water have been attempted in the past. The prior art of Hunter's Shower Bath Economizer (U.S. Pat. No. 4,372,372) uses a chamber below the drain with a helical coil within forming a type of coil-in-shell heat exchanger. Nobile, in his heat recovery device of U.S. Pat. No. 5,791,401, uses a coil of tubing containing the incoming cold water wrapped around a formed section of the drain pipe to recover heat from the waste water. Vasile et al. in his U.S. Pat. No. 4,619,311 uses a contraflow heat exchanger formed around the straight drain pipe to the sewer to recover some heat. Sheffield, in his U.S. Pat. No. 4,821,793, uses an above the floor tub and shower floor heat exchanger for the same heat recovery function.

The prior art of Cardone's U.S. Pat. No. 4,304,292 for a shower waste heat recovery system is described in detail in FIGS. 1-6 provided below. While it is a workable system for recovery of heat from the grey waste water, it did have a shortcoming such that it was not compatible with some plumbing codes regarding removability of clogs in the drain.

BRIEF DESCRIPTION OF THE DRAWINGS OF THE PRIOR ART OF CARDONE '292

Figures 1, 2:
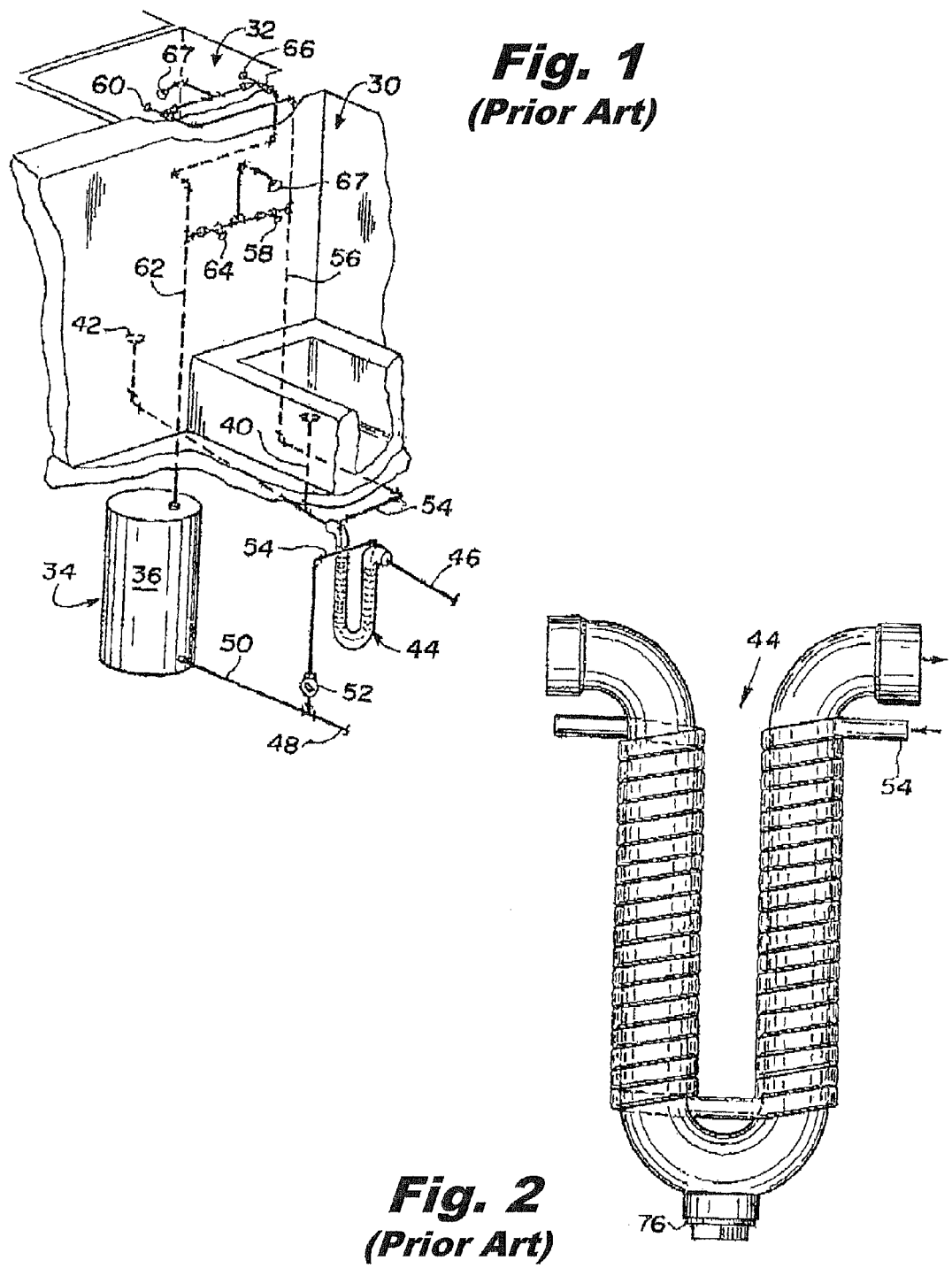
FIG. 1 is a simplified diagrammatic view of the water connections in Cardone '292 to and from a household shower embodying a conservation technique according to the prior art.
FIG. 2 is a front elevational view, on an enlarged scale, illustrating one embodiment of a heat exchanger in Cardone '292 for practicing the method and for using the preferred structure of the prior art.

In the prior art of Cardone '292, with the significant shortcoming subsequently noted above, it already is known that use is made of discharging water from a household shower, either of the tub-type 30 or stall-type 32, to effectuate significant energy conservation, wherein as is typically the case, the household has a boiler 34 of the type which includes a storage tank 36 which tank, depending upon boiler-heated water available for use for such purposes as showering at locations 30, 32.

The prior art will be understood for the set-up for the showers 30 or 32 to include a tub drain conduit 40 or a stall shower drain 42, wherein the drain channels the discharging water through a trap of U-shaped design designated 44, on its way to a sewer connection 46.

It is known that the water discharging through the U-shaped conduit 44 is, in most cases, tepid, being a mixture of boiler-heated warm water and a cold water input to the showers, 30, 32.

In the above respect, it has been noted that the discharging water that normally drains is approximately 100° Fahrenheit at the time encountering the U-shaped conduit 44. This otherwise wasted 100° Fahrenheit water is effectively passed in heat exchange relation to the cold water input, which in the community of Wantagh, N.Y., is typically supplied at 50° Fahrenheit. The heat exchange has been found in practice to provide a lukewarm water source at approximately 65° to 75° Fahrenheit for delivery to the faucet connection 58, 60 of the showers 30, 32. This increase in approximately 15° to 25° Fahrenheit significantly diminishes the amount of boiler-heated water that is required to be delivered to the showers 30, 32. While the beneficial results depend on different operating conditions and thus cannot be defined with precision, in practice use of the invention for 28 successive showers at a selected tepid temperature of 110° Fahrenheit for the pre-mixed water and during a selected duration time for showering of 10 minutes which consumed approximately 15 gallons of the prior art set-up of FIG. 1.

Figure 5:
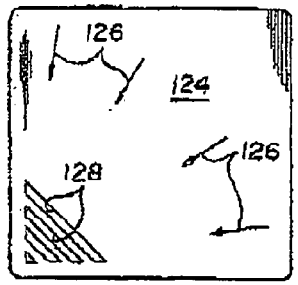
FIG. 5 is a plan view of a removable floor panel of this shower embodiment in Cardone '292.
Figure 6:
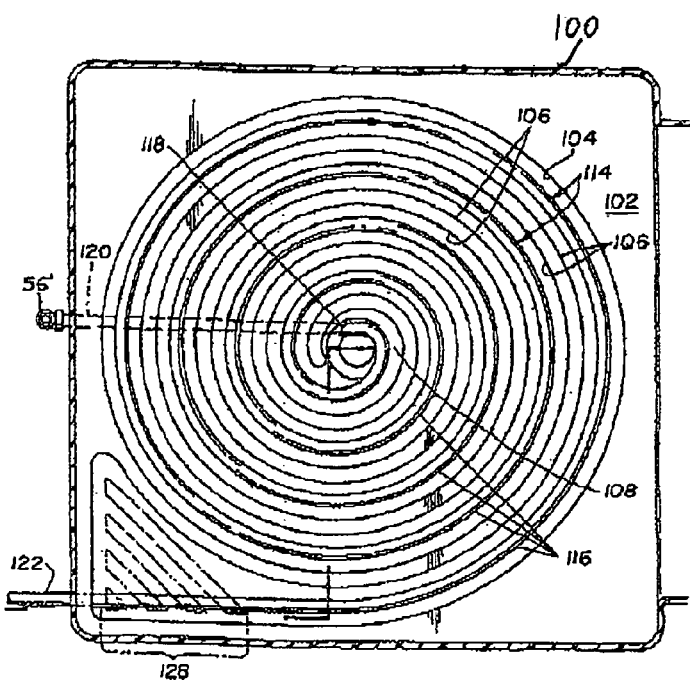
FIG. 6, like FIG. 5, is also a plan view, but on an enlarged scale and illustrating the heat exchanger in Cardone '292 which is situated below the floor panel of FIG. 5.

Cardone's U.S. Pat. 4,304,292 for heat conservation, unfortunately with the shortcoming noted above, is nevertheless commendably practiced as best illustrated in FIGS. 5 and 6, which correspond to FIGS. 8 and 9 of Cardone '292, as well as what is shown in the crossectional detail view of FIG. 10 of Cardone '292, in which a floor of shower 30' includes a base 100 in the upper face or surface 102 of which there is embodied, in any appropriate manner, a spiral trough, generally designated 104 in FIG. 6 and the individual helical turns of which are designated individually and collectively 106. By slight increases in depth of the individual helical turns 106 the trough 104 is pitched to drain towards central opening 108 of base 100 of FIG. 10 of Cardone '292,, in which opening there is an appropriate drain fitting (not shown) which mounts a depending conduit (not shown) which will be understood to discharge into a sewer or the like. In accordance with the prior art, a pipe 114 suitable for flowing water to the shower (not shown) and itself in a helical configuration as illustrated, is deposited in the correspondingly helically configurated trough 104. That is, and as is perhaps best illustrated in FIG. 6, the individual helical turns of the spiral pipe 114, designated individually and collectively 116 are each located in a cooperating one of the helical turns 106 of the spiral trough 104. Connected at the center, as at 118 to the spiral pipe 114, is the shower cold water inlet pipe or conduit 122, as shown in Prior Art FIG. 6 herein, and in FIG. 9 of Cardone '292. The cold water outlet connection from the spiral pipe 114, designated 120, extends from the outermost helical turn and is connected to the shower faucet cold water conduit 56'. As a result, the cold water input to the shower 30' is delivered through the helical heat exchanger 114 prior to delivery through the shower head (not shown). More particularly, cold water from a suitable source initially flows through the inlet pipe 120, then successively through each of the helical turns 116 to the helical pipe 114, and then finally through the outlet pipe 120 into the faucet pipe 56' where, upon opening of the valve (not shown), the water is discharged through the shower nozzle (not shown).

However, the prior art of Cardone '292 does not reveal a shower heat recovery system using a high efficiency flat plate heat exchanger with specific features for drain clog removal.

OBJECTS OF THE INVENTION

It is therefore an object of the present invention to provide a shower heat exchanger which preheats incoming cold street water while reducing the need for a hot water heater/boiler to supply hot water for a shower.

It is also an object of the present invention to provide a shower hot water heat exchanger which complies with applicable plumbing codes requiring access for removing clogs and which promotes the removal of standing stagnant water.

Other objects which become apparent from the following description of the present invention.

SUMMARY OF THE INVENTION

In keeping with these objects and others which will become apparent, the shower heat exchanger system of this invention, while complying with plumbing and sanitary standards for clog removal from drains, offers very high efficiency of heat recovery using a unique flat plate heat exchanger strategically placed below a tub or shower stall (or even below the bathroom floor).

The concepts of this invention are designated by the acronym SHWERD™ which is derived from "Shower Hot Water Energy Recycling Device".

The standard drain inside the tub or shower stall accepts the grey waste water and directs it in a precise manner to impinge upon one end of a slightly tilted top plate (preferably copper) of the heat exchanger. This top plate is fastened robustly to a flat heat exchanger lower plate (preferably made of a sheet of rigid synthetic material such as PVC approximately ¼"-⅜" thick or of a heat conductive material, such as copper). The lower plate is thermally insulated from below and on its sides. The lower plate has a serpentine pattern routed into its top side to a shallow depth such that the top plate, when fastened and sealed to it, forms a continuous chamber or serpentine conduit for containing the cold water flow. Thus it is understood that heat is transferred from the waste water falling on the top plate and spreading over it to the cold water flowing underneath the top plate in a tortuous serpentine pattern in contact with the bottom surface of the top plate. The cold water is thereby preheated and used as a substitute for the cold water that would be normally plumbed to the shower head. This therefore reduces the amount of hot water flow required to achieve the desired showering temperature. The geometric relationship between the drain and the placement of the heat exchanger underneath guarantees the counterflow of the waste water flowing atop the heat exchanger and the cold water flow going back and forth across the underside of the top plate and inching its way toward the vicinity of the tub drain, which is the hottest portion of the top heat exchanger plate. In this manner, the greatest rise in temperature of the preheated cold water is achieved, since the waste water enters the sewer outlet, at a temperature that can be significantly lower than that of the preheated cold water, while still transferring heat to the even colder inlet cold water, entering at the waste water discharge end of heat exchanger. At the top end of the heat exchanger near the drain outlet, the waste water is hotter than the preheated cold water beneath, so that it is still raising the temperature of the preheated cold water, just before discharge through the shower head.

In a typical example, cold street temperature water of about 50 degrees Fahrenheit is exposed to typical hot shower water of about 120 degrees Fahrenheit through the heat exchanger. This exposure quickly raises the cold water to a preheated temperature of about 90 degrees Fahrenheit, which mixes with a reduced amount of hot water, to a final temperature, also of about 102-108 degrees Fahrenheit, which also reduces the need for using a hot water heater/boiler to heat hot water for a shower.

One way to insure the efficiency of the heat exchanger of this invention is to have many reversals of the cold water path close together and with small width. In another embodiment, a wide water path is used through the heat exchanger with fewer reversals in the serpentine. To increase efficiency, fins are optionally added to the underside of the copper plate in the region of the serpentine below that would be wet by the cold water flow; this increases the effective area of contact. It is also noted that the upper plate can be made integral with the serpentine sections and base supporting the serpentine sections by the base plate being made of copper or other heat conductive material, with the corrugated walls of the serpentine sections extending upward from the lower base plate to the upper heat conductive copper plate, so that the entire heat exchanger unit is heat conductive, but thermally insulated on its sides and from below.

The serpentine sections can be either channels cut in the lower PVC plate or channels formed of copper walls. In addition, the serpentine sections can be formed from parallel tubes (of any geometric configuration, round or straight sided, with flat walls) with curved or angled manifolds, forming the curved or angled corners connecting the straight portions, formed from the parallel tubes. However, whether the bottom plate is PVC or copper, since the top plate is a good conductor for spreading heat from the waste grey water laterally in case the flow from the drain does not spread evenly; therefore the heat must be conducted through the plate to be deposited to the water flowing under it. It is beneficial for the heat to stay there and not leak out the bottom or sides of the base. This is why the heat exchanger is wrapped underneath in insulating foam or other insulating material. The base plate is thermally insulated at the sides and bottom, such as by a thick layer of solid or spray-on foam insulator.

In the first embodiment of this invention, the heat exchanger is plumbed directly with the cold water supply at the bottom (cold end) with the cold water shower valve at the preheated end feeding the shower head mixing area. This means that the heat exchanger remains at supply pressure even when the shower is not in use. In an alternate embodiment, the plumbing is re-routed to feed the cold end of the heat exchanger through the shower cold water valve with the preheated cold water outlet of the heat exchanger directly plumbed to the shower head mixing area. While the operation to the user is identical, the heat exchanger is no longer pressurized when the shower is not in use. This is called a "Dry Base Exchanger" configuration, whereby if the heat exchanger were damaged or punctured, it would not leak profusely, since it is not pressurized.

In the first embodiment, the drain is preferable at the end of the tub opposite the shower head, while the sewer connection is retained at its normal location at the shower head end. This can be easily accomplished by turning the tub around since it is reversed from normal practice. Note that an alternate embodiment retaining the drain at the shower head end of the tub is also possible, but the sewer connection will then be at the opposite end. Either will perform equally, but one may be easier to install than the other.

In yet another embodiment, a service chamber is appended to the tub at the end near the sewer connection which discharges grey water after it has run down the heat exchanger top plate. This chamber has an easily removable top cover permitting direct access to the sewer opening so that a plumber's snake can be directly entered thereby bypassing the excursion down the length of the top plate.

Because of the continuous preheating of cold inlet water, there are less BTU's consumed, and subsequent showers remain warm even after multiple showers.

BRIEF DESCRIPTION OF THE DRAWINGS OF THE INVENTION

The description of the invention which follows, together with the accompanying drawing, should not be construed as limiting the invention to the example shown and described, because those skilled in the art to which this invention appertains will be able to devise other forms thereof. The drawings are diagrammatic, and not drawn to scale of actual use.

Figure 3:
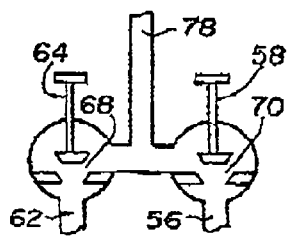
FIGS. 3 and 4 are simplified instruction diagrams illustrating the boiler-heated warm water input to the household shower in Cardone '292.
Figure 4:
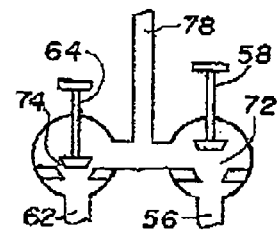
Figure 7:
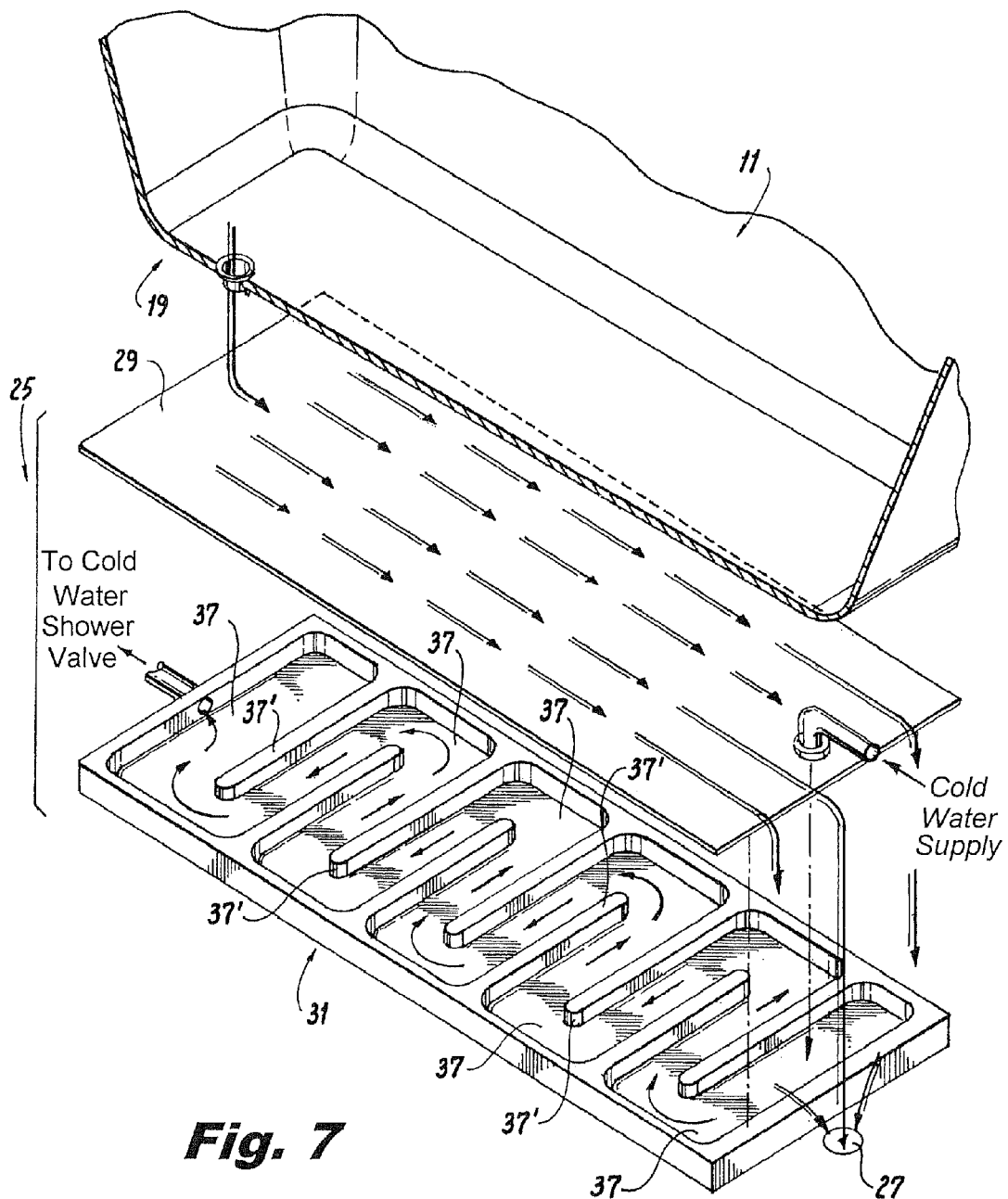
Figure 7A:
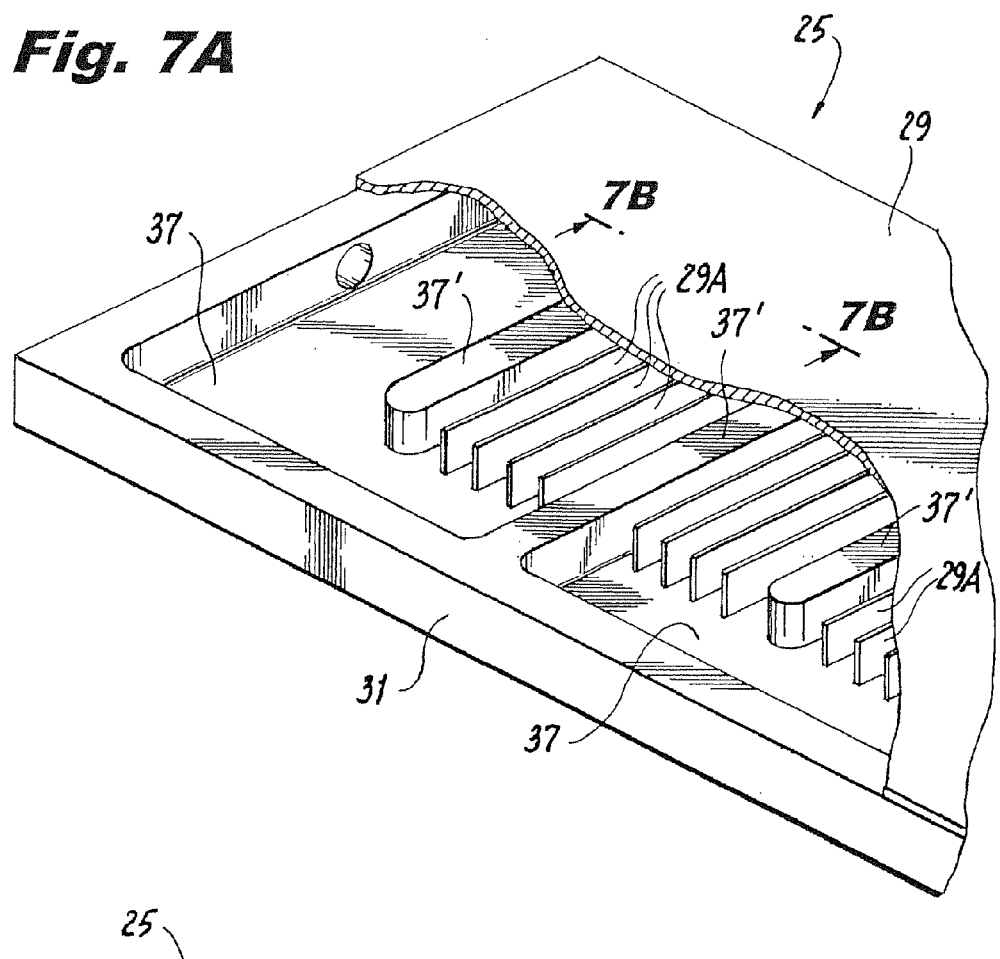
Figure 7B:
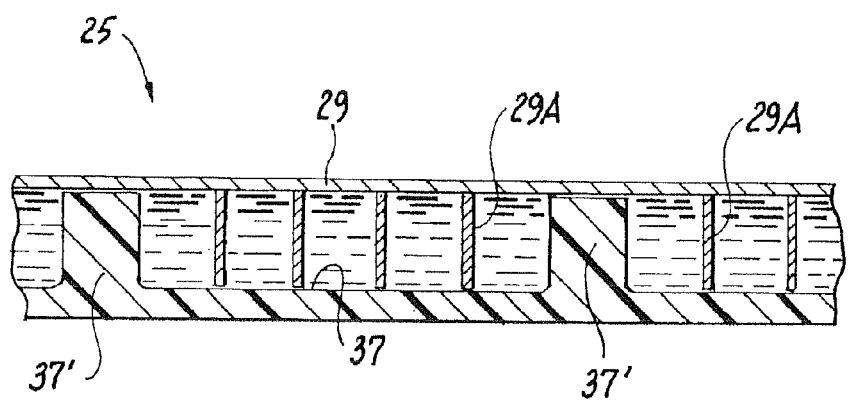
Figure 7C:
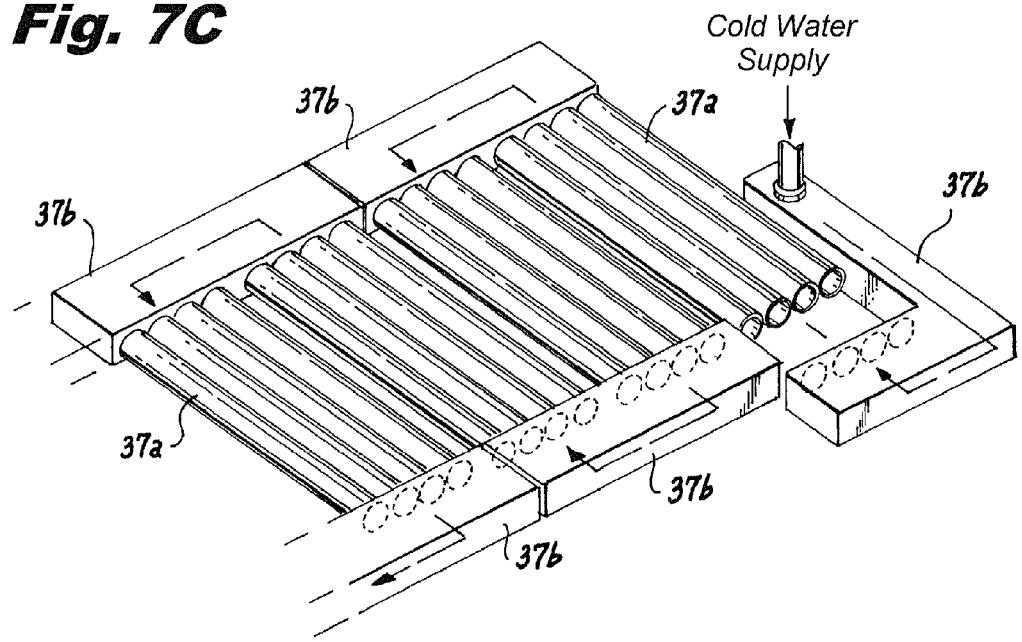
Figure 7D:
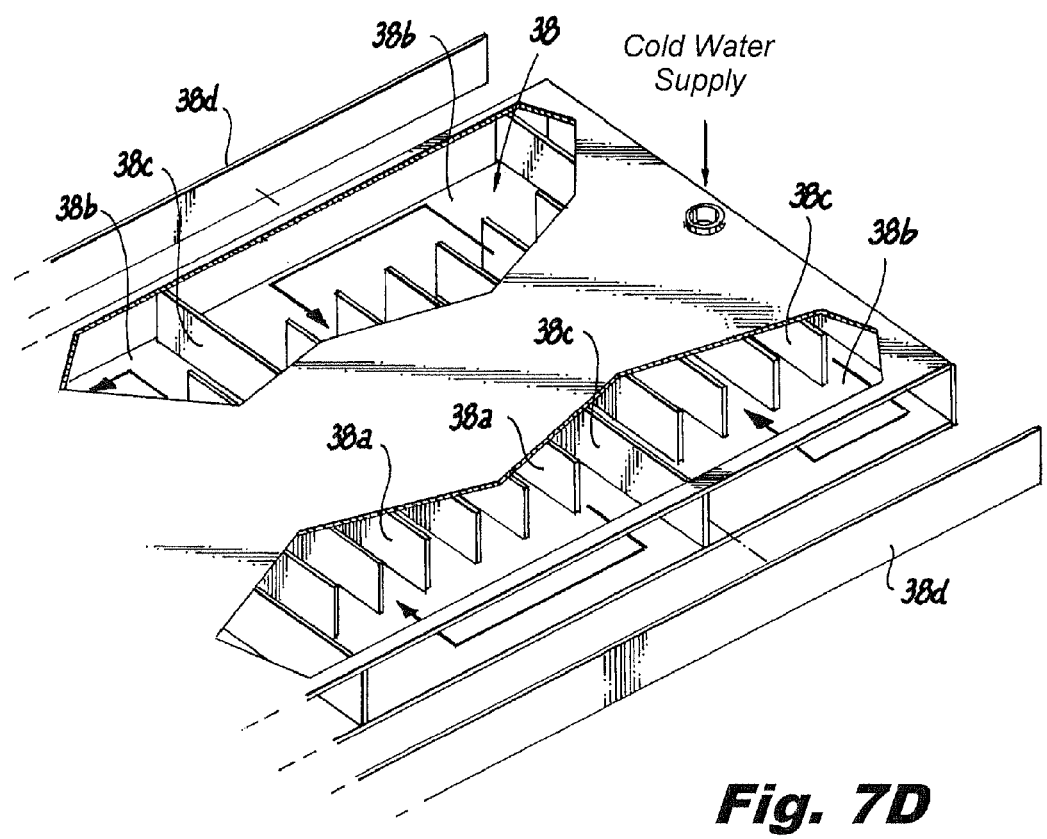
Figure 11:
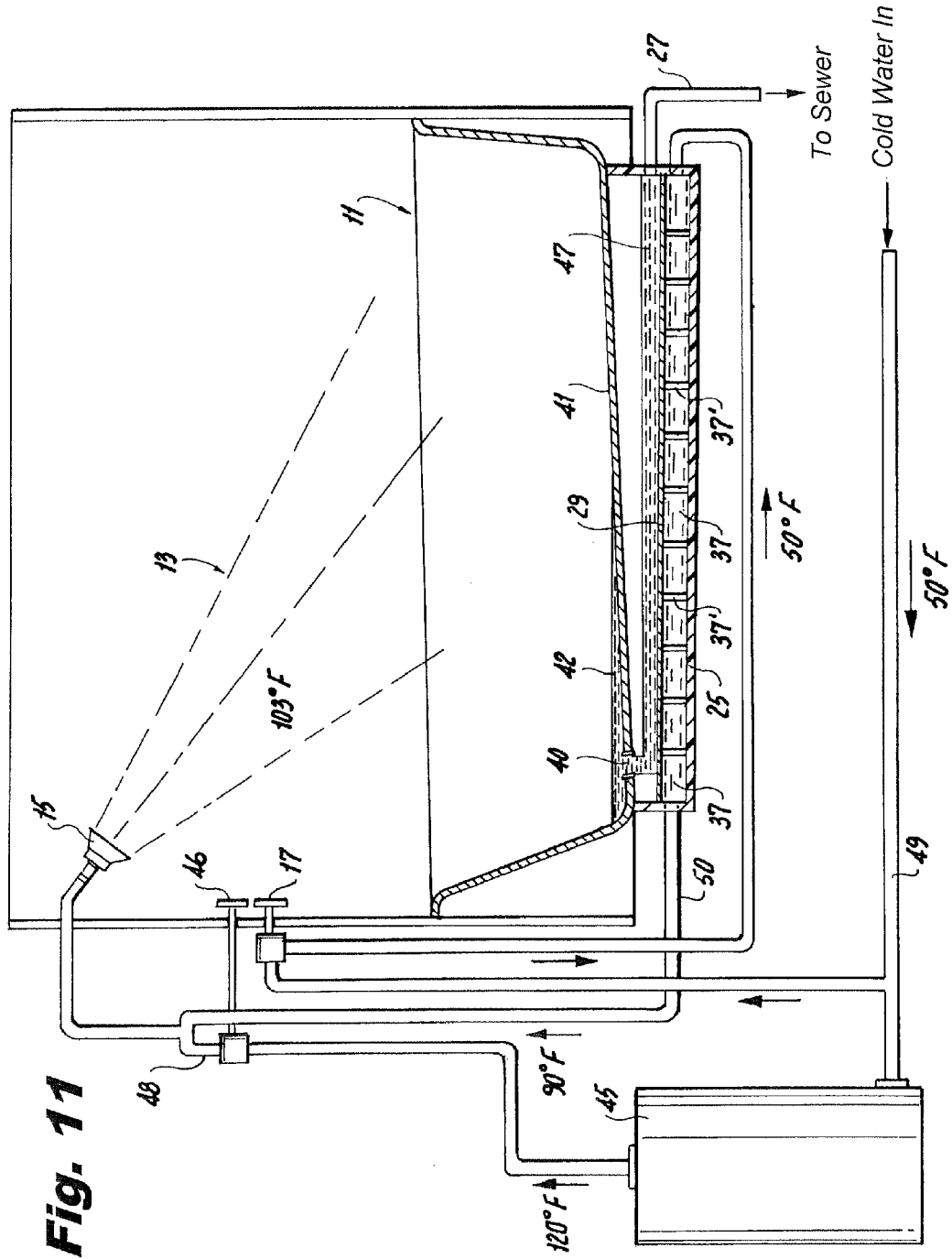
Figure 12:
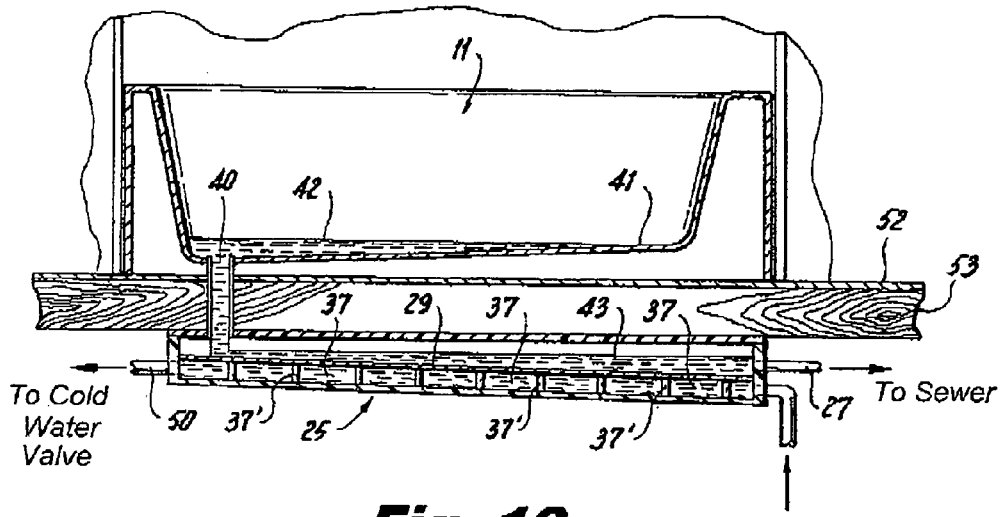
Figure 13:
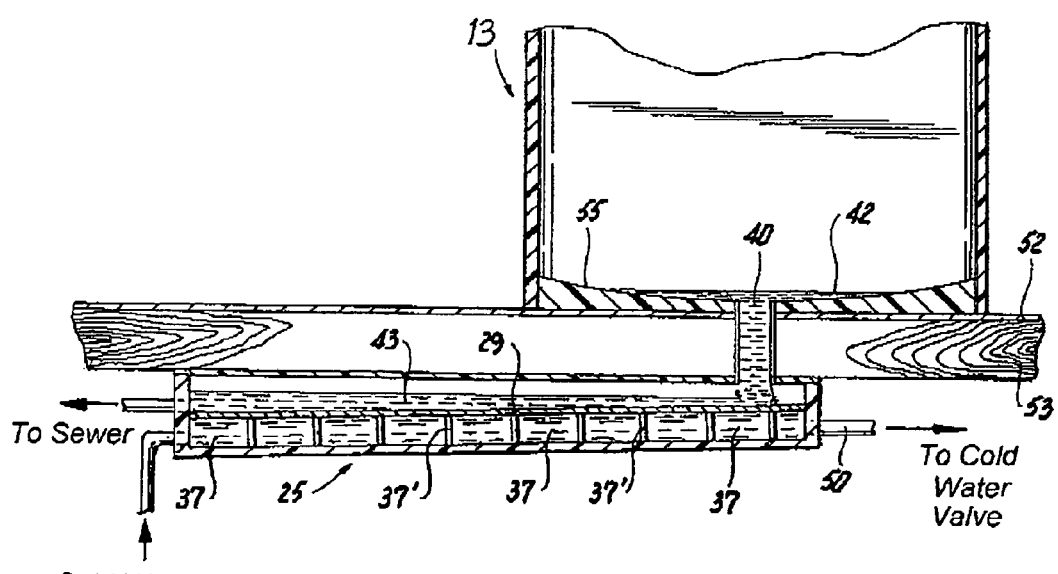
Figure 14:
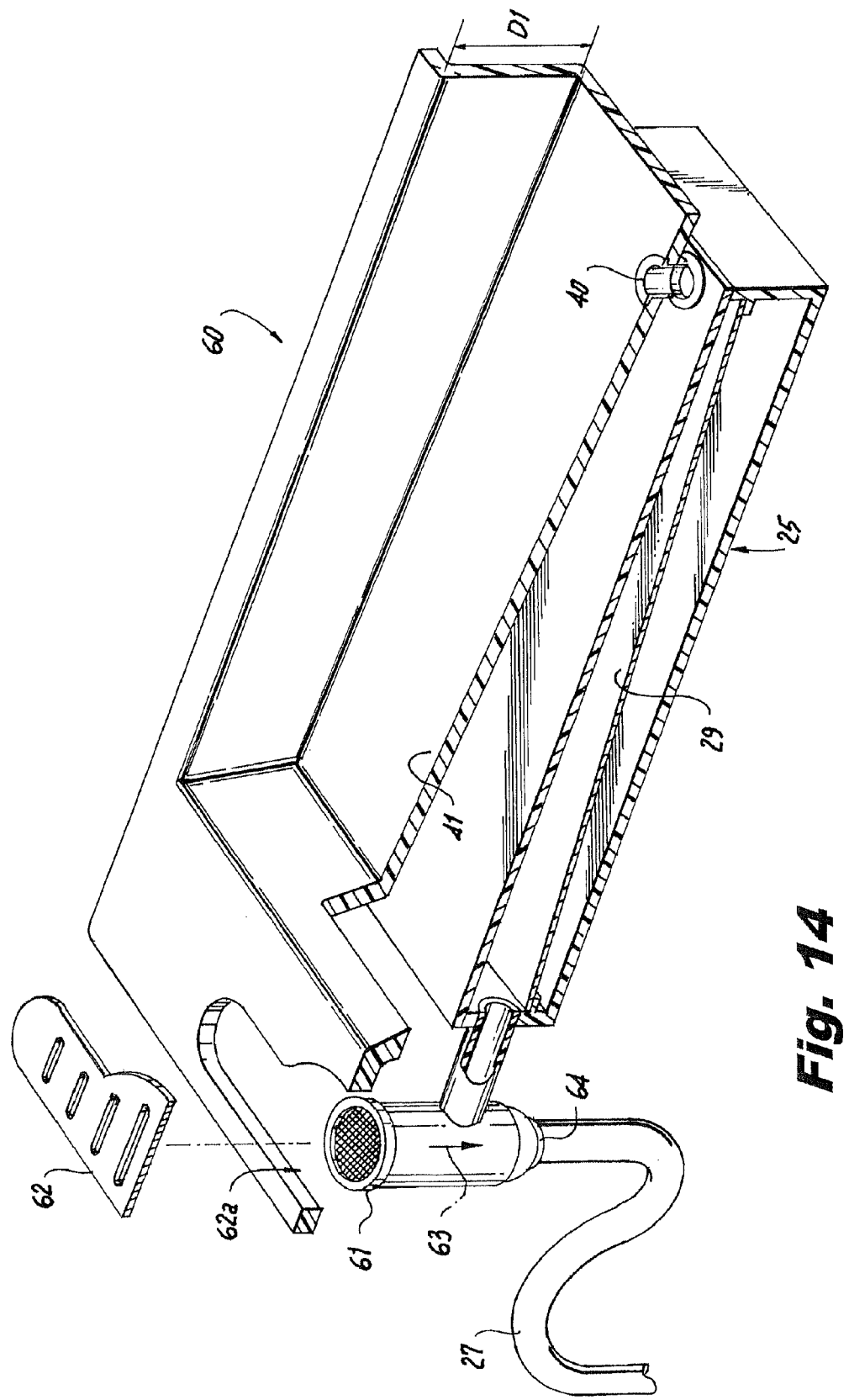
Figure 16:
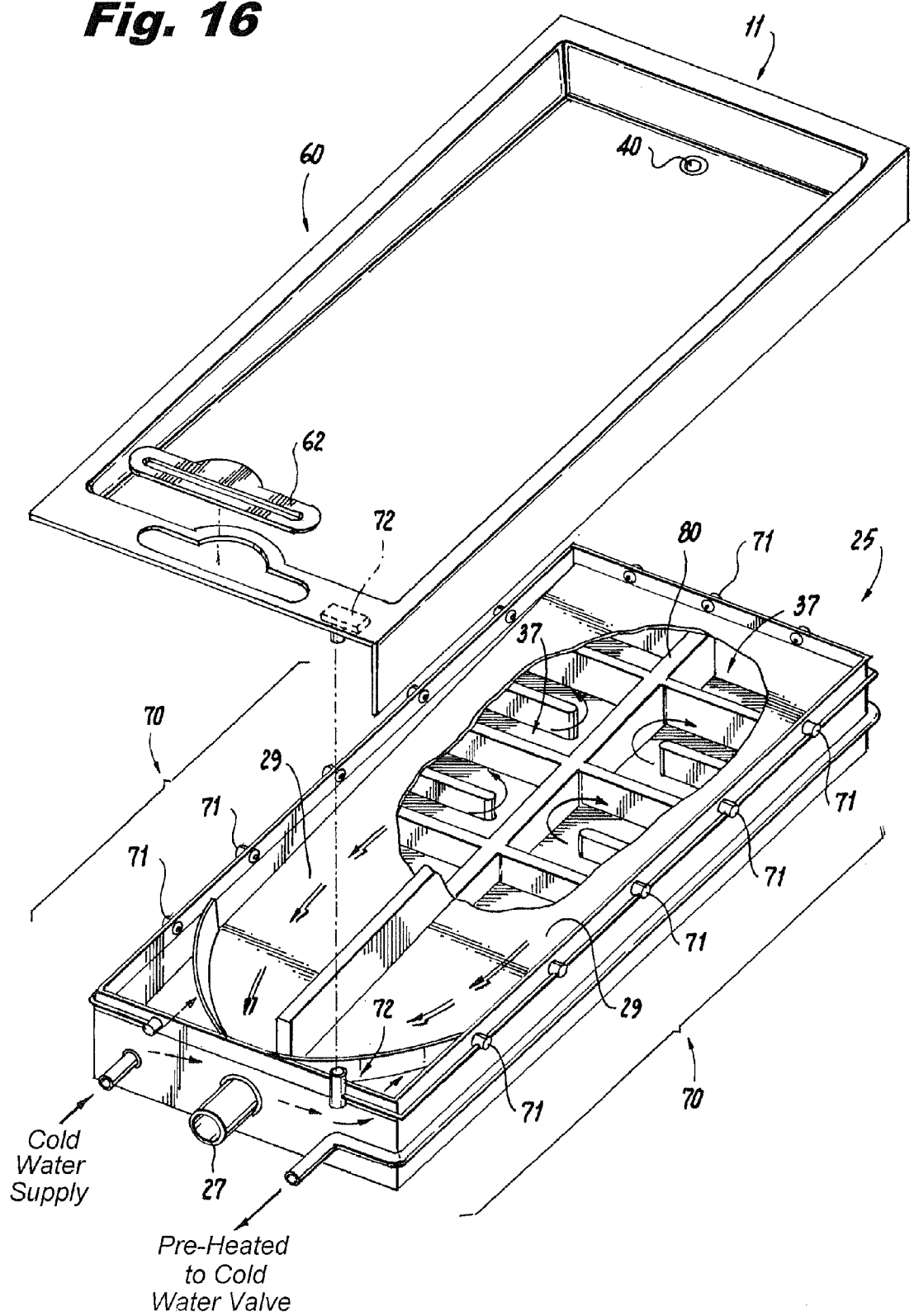
Figure 17:
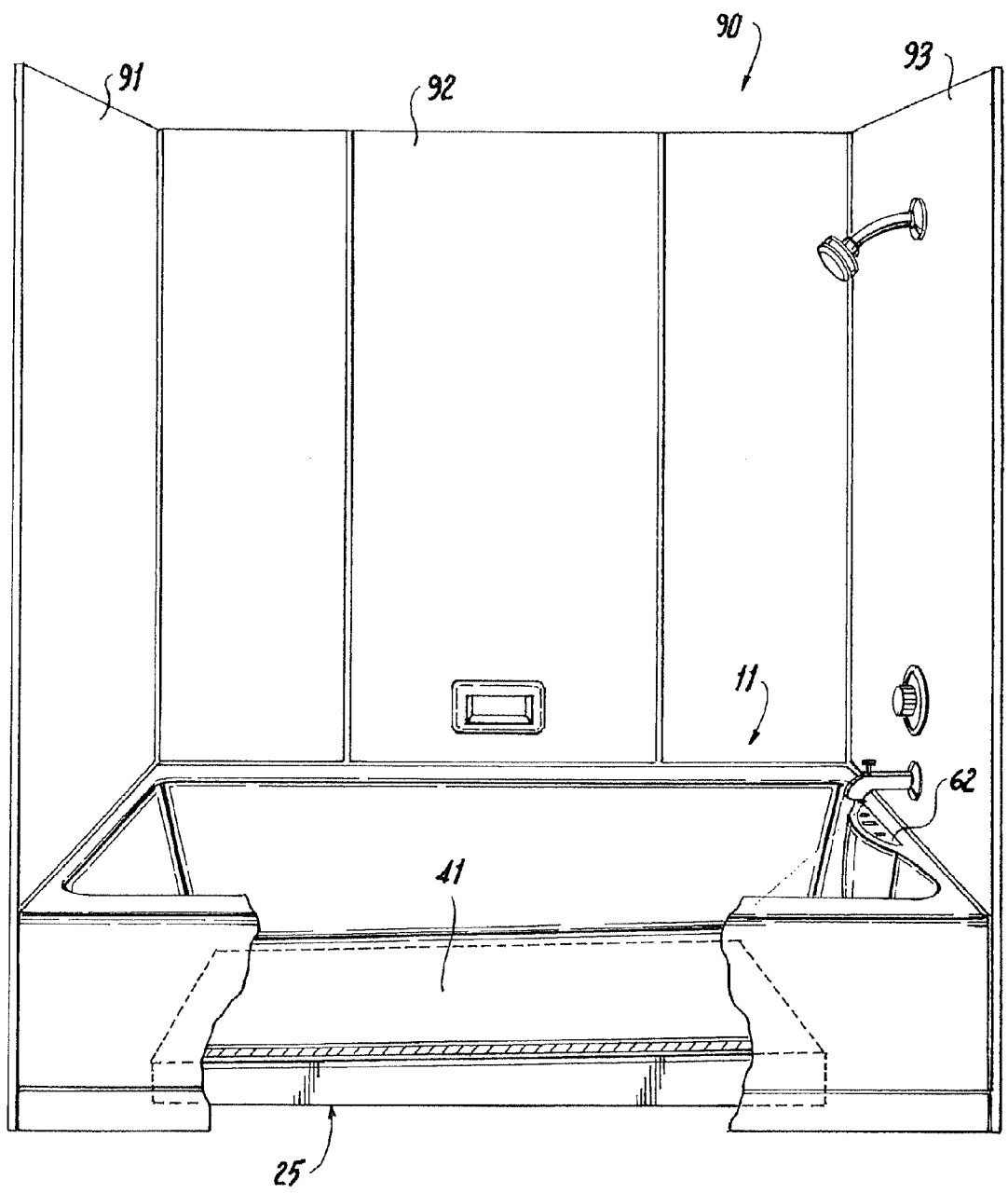
Figure 17A:
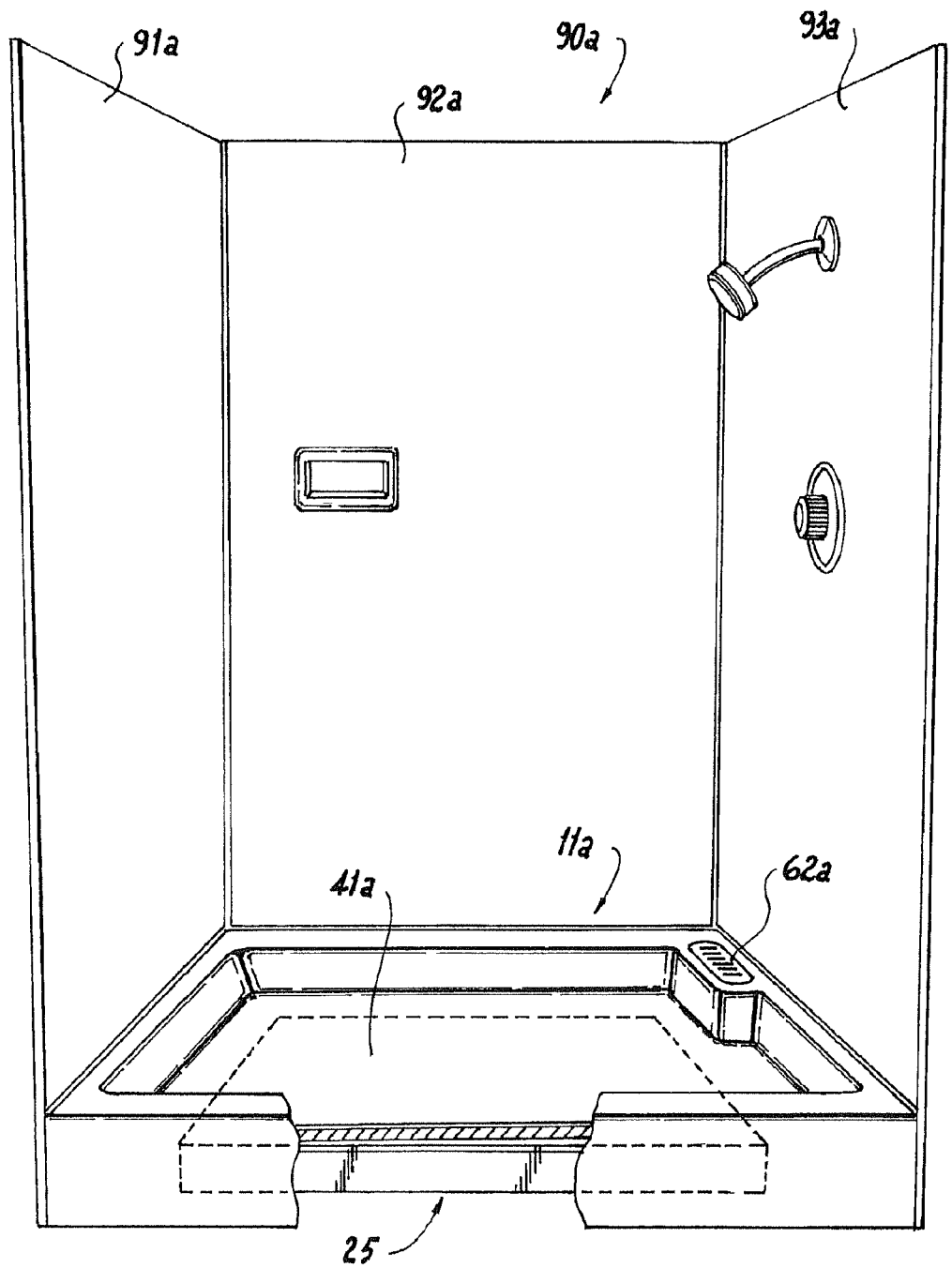

FIG. 1 is a simplified diagrammatic view of the prior art water connections in prior art U.S. Pat. No. 4,304,292 of Cardone to and from a householdshower embodying a conservation technique according to the prior art;

FIG. 2 is a front elevational view, on an enlarged scale, illustrating one embodiment of a prior art heat exchanger in prior art U.S. Pat. No. 4,304,292 of Cardone for practicing the method and for using the preferred structure of the prior art;

FIGS. 3 and 4 are simplified instruction diagrams illustrating the prior art boiler-heated warm water input to the household shower in prior art U.S. Pat. No. 4,304,292 of Cardone;

FIG. 5 is a plan view of a prior art removable floor panel of this shower embodiment in prior art U.S. Pat. No. 4,304,292 of Cardone;

FIG. 6, like FIG. 5, is also a plan view, but on an enlarged scale and illustrating the prior art heat exchanger in prior art U.S. Pat. No. 4,304,292 of Cardone which is situated below the floor panel of FIG. 5;

FIG. 7 is an exploded perspective view of the bathtub, partially in section, and of the heat exchanger, both in accordance with the present invention; wherein the flow of street water being preheated is indicated by single line arrows and wherein the flow of exiting grey hot water is indicated by double line arrows;

FIG. 7A is an exploded perspective view in partial cutaway, similar to FIG. 7, but optionally showing the addition of fins to the underside of the top plate of the heat exchanger to enhance heat transfer;

FIG. 7B is a side view crossection of the assembled heat exchanger of FIG. 7A showing the added fins immersed in cold water flow within the serpentine channels;

FIG. 7C is a close-up detail perspective view of a fluid path schematic diagram of an alternate embodiment for serpentine sections where parallel round tubings are connected by corner sections;

FIG. 7D is a close up detail perspective view of a portion of parallel tubings of angled corrugated fluid path sections in serpentine configuration, with straight rectangular walls connected by angled corner sections;

FIG. 8 is a side elevational view, in assembled condition, of the bathtub and heat exchanger of FIG. 7;

FIG. 9 is a partial elevational view, in section, of the structure noted by the reference arrow 9 in FIG. 8;

FIG. 10 is also a partial elevational view, in section, but of the structure noted by the reference 10 in FIG. 8;

FIG. 11 is a side view schematic representation illustrating the cold water piping flow of a Dry Base Exchanger embodiment whereby the input to the heat exchanger is controlled by the cold water valve;

FIG. 12 is a side view schematic showing the heat exchanger of this invention located below the bathroom floor and servicing a tub above;

FIG. 13 is a side view schematic showing the heat exchanger located below the bathroom floor and servicing a shower stall;

FIG. 14 is a side elevation of an alternate embodiment for a tub with a side attached service chamber providing unobstructed access to the sewer pipe connection, where the side attached service chamber comprises a wide pipe with a breather cap;

FIG. 14A is a side elevational view in crossection of the tub and heat exchanger of FIG. 14;

FIG. 15 is an exploded perspective view of an alternate embodiment, showing an access plate over the chamber having a pipe wherein the porcelain tub is shown separated from the heat exchanger plate, which includes a concave end portion in the vicinity of the sewer connection drain, and wherein a series of elevated water-sealed peripheral walls are provided with a minimum 2" clearance under the bottom of the tub/shower stall, for removing clogs pursuant to the Uniform Plumbing Code;

FIG. 16 is an exploded perspective view of the shower heat exchanger showing an auxiliary peripheral jet flush-out system, as well as an optional central divider brace;

FIG. 17 is a perspective view of a factory produced tub/shower stall modular unit with liner walls having the show heat exchanger built integral therein; and, FIG. 17A is a perspective view of a factory produced shower stall modular unit with liner walls having the show heat exchanger built integral therein.

DETAILED DESCRIPTION OF THE INVENTION

In the preceding discussion of the prior art U.S. Pat. No. 4,304,292 of Cardone, reference was made to a shortcoming. This shortcoming is, as required by the sanitary code of most intended sites of use, that the system used have the ability of clog-removable functioning in the drain to the sewer. In the system now to be described, it should be readily understood that hypothesizing the "clog" as a two-inch-diameter ball stuck in the drain to the sewer, that the removal with a snaking cable or the like is readily achieved. Thus this invention complies with the Uniform Plumbing Code.

The present system of heat recovery of this invention has no such shortcomings. Shown in FIGS. 7 and 8, in the former in exploded relation, and in the latter in assembled relation, is a bathtub, generally designated 11 in its use mode as illustrated in FIG. 8 as a shower, as noted by arrow 13, received from a shower head 15, the volume of the shower 13 being a function of the valving of two on/off faucets 17, one for cold water and the other for boiler-heated water, wherein the result of this mixing of inputs results in a tepid temperature of the shower 13, as previously explained in the discussion of the prior art.

As shown in FIGS. 7-10, the tepid water 13 drains at the remote bathtub end 19, i.e. an end usually not the conventional bathtub location, and flows, as noted by single line arrows 21 in the clearance 23, which serves as a passageway above the heat exchanger 25, emptying as best shown in FIG. 10 in an outlet 27 which is in fluid communication with the exiting boiler-heated hot water source used for the shower 13, exiting as grey water, and identified as double line arrows cascading across heat exchanger plate 29 and exiting through outlet 27.

The heat exchange function results from the use of a closure plate 29 of copper construction material, appropriately attached over a base 31 having edges bounding a passageway outlet 33 of tepid water 13 exiting from the bathtub remote end 19. As shown in FIGS. 9 and 10, base 31 includes a layer of insulation 31a, such as STYROFOAM® foam or other insulating material, which may be an integral layer, or may be attached by spraying or attaching from below. The insulating material can be any kind of natural or synthetic resinous cellular material. The insulating layer applies to all embodiments herein.

Passing in heat exchange with the tepid water 13 is the cold water input into the heat exchanger 25, as explained in the previous discussion of the prior art, the input being at the heat exchanger end and flowing in a sinusoidal flow pattern, as noted by arrow 37, said sinusoidal pattern lengthening the heat exchange duration of the tepid water and cold water inputs constituting the showering water 13.

Note in FIG. 7 base 31 has few direction reversals. In actuality, much narrower water channels 37 formed between sinusoidal heat conductive walls 37' in a separate pathway and reversals every 2" or so are used to enhance heat transfer. Moreover, the depth is preferably about ⅛" in depth as used, although depth may vary, as long as effective heat transfer occurs.

An alternative method of increasing heat transfer from top plate 29 to the water in channels 37 is to maintain the broad serpentine pathway of FIG. 7, but to add heat transfer fins 29A (as shown in FIGS. 7A and 7B) attached to the underside of plate 29 and dipping into the water channels below. Heat transfer fins 29A can extend all the way down from heat conductive plate 29 to base 31, or they can extend partially down (not shown).

Although drawing FIG. 7 shows a meandering serpentine pathway which is in contact with the heat exchanger plate 29 above, in FIG. 7C there is shown a fluid path schematic diagram of an alternate embodiment for serpentine sections where parallel round tubings 37a are connected by corner sections 37b, and wherein the tubings contact the heat exchanger plate 29 at the tangent where the tops of each tubing portion 37a contact heat exchanger plate 29 above. Optionally, in another embodiment, where the tubes are heat conductive (such as copper), use of heat exchanger plate 29 can be dispensed with. In that use, the hot shower grey water can flow over the tops of round tubings 37a without heat exchanger plate 29, so that heat is exchanged directly through the tubings 37a to the cold street water being preheated.

Likewise, in FIG. 7D there is shown a portion of parallel tubings of angled corrugated fluid path sections 38 in serpentine configuration, with straight rectangular walls 38a connected by corner sections, where the tops of the straight walls 38a contact the flat heat exchanger plate 29 above. In FIG. 7D the walls 38a are foreshortened in the hollow corner areas 38b, to provide the serpentine pathway for the incoming cold street water to flow therethrough, forming the preheated water as the cold water is in thermal contact with the heat generated by hot shower water passing over flat heat exchanger plate 29, located above the serpentine pathway portions 38 formed by straight walls 38a. Some of the walls 38c extend at one side all the way to an outer wall, to form a closed area, to direct fluid flow around corners and through the serpentine configuration.

As a result of the foregoing, the "cold" water input into the showering water 13 is raised to an elevated temperature than it would have had otherwise, with a first important consequence that less boiler-heated water 17 is required for the showering water 13.

A second important consequence is that the just noted savings is achieved by the described operating mode which complies with the sanitary code of most intended sites of use, i.e. that that system used, as more particularly described and illustrated in FIGS. 7, 8 and 9, have the ability of clog-removable functioning in the drain to the sewer. For example, the region below tub/shower stall 19 and above heat conductive plate 29, through which shower waste grey water passes, is at least two inches in height, to permit a snake to clear out that area of any clogs, pursuant to the Uniform Plumbing Code. To enhance aiming and movement of the snake, the region near sewer outlet 27 at the opposite end of the heat exchanger can be optionally provided with a concave region 25a surrounding the sewer outlet 27, as shown in FIG. 15, so that when the distal end of the snake approaches the sewer outlet 27, it is directed to the sewer outlet 27. This option is applicable to any of the embodiments for the heat exchanger of the present invention.

The embodiment shown in the side schematic of FIG. 11 has two notable changes from that of FIG. 8. The first change is that drain 40 is located at the same end as the shower head and valves which is the conventional arrangement. The second is the routing of the cold water relative to cold water valve 17 and heat exchanger 25. This latter routing is called a Dry Base Exchanger.

FIG. 11 illustrates a tub 11 with floor sloping downward toward left toward drain 40 with water 42 discharging through it. Heat exchanger 25 slopes downward toward the right with grey water 47 discharging from the top plate to the sewer connection and pipe 27 on the end opposite from that of FIG. 8 (now placed away from the shower head). Water heater 45 receives cold water at 50 degrees Fahrenheit and feeds 120 degree water through hot water valve 46. As opposed to FIG. 8 practice, cold water is fed directly to cold water valve 17 and then to the cold water input of heat exchanger 25. It is boosted in temperature to 90 degrees Fahrenheit and connects directly through pipe 48 to the mixing region to then be discharged through shower nozzle 15 at 103 degrees Fahrenheit. This Dry Base Exchanger cold water routing through valve 17 prior to heat exchanger 25 means that exchanger 25 is not pressurized when not in use. If the top plate or base portion were to be damaged during the standby period (most of the time), it will not leak profusely, damaging the surroundings, since the system only contains the water in the serpentine and that in the piping to the shower head to leak out. The Dry Base Exchanger piping hook-up is the preferred embodiment and may be used as a substitute for the pressurized heat exchanger hook-up in any of the illustrations and embodiments shown.

While heat exchanger 25 can be installed below an elevated tub as shown in FIG. 8, the heat exchanger can be conveniently placed below the bathroom floor leaving the tub at its normal height. This is especially convenient if the bathroom is over an unfinished basement. FIGS. 12 and 13 are schematic views showing such an installation for a tub and for a shower stall respectively. FIG. 12 shows tub 11 with sloping internal floor 41 at its normal height resting on bathroom floor 52. Heat exchanger 25 is installed below floor 52 level and possibly attached to conveniently located beam 53. In FIG. 13, shower stall 13 rests normally on bathroom floor 52 while heat exchanger 25 is below floor 52 level and can be attached to beam 53. Note that concave inner shower stall floor 55 drains atop the heat exchanger top plate in a similar fashion to a tub installation.

The embodiment of FIGS. 14 and 14A show the use of an optional service chamber 62a attached to the end of tub 11 adjacent to the sewer pipe connection 64. It has an easily removed decorative access cover 62. If one looks straight down chamber 62a with cover 62 removed, the sewer pipe connection 64 can be see in unobstructed view at the bottom of pipe 63a, so that a plumber's snake and/or chemical clog removers can be administered along the straight short path 63 (shown in arrows). This direct access to sewer connection 64 bypasses the bend at drain 40 and the length of the top plate 29 of heat exchanger 25 which would have to be traversed through drain 40 otherwise. This area within chamber 61 can also be used to flush out the top plate surface with a water hose or pressure cleaner since the entire width of plate 29 is accessible through it.

FIGS. 14 and 14A also show a side elevation in crossection of an alternate embodiment for a tub 60 with side attached service chamber 62a providing unobstructed access to the sewer pipe connection 64, where the side attached service chamber comprises a wide pipe 63a with a breather cap 61 underneath access cover 62. Typically, pipe 63a is a wide pipe of approximately 5" in diameter leading to sewer connection 64. As can also be shown in FIG. 14, tub 60 having a depth "D1" of approximately 7" indicates that the bottom of pipe 63a can be reached with a plumbing snake or even manually by a person cleaning pipe 63a with their hand and forearm. Depth D1 can vary from 2" up to high tube depths of 14 inches or more.

FIG. 15 is an exploded perspective view of an alternate embodiment for the system 60 of FIGS. 14 and 14A showing an access plate 62 over chamber 63 having pipe 63a wherein in the porcelain tub 11 is shown separated from the heat exchanger plate 29, which includes an optional concave end portion 25a in the vicinity of the sewer connection drain 64, and wherein a series of elevated peripheral water sealed walls 25b-25e are provided with a minimum 2" clearance under the bottom of the tub 11 for removing clogs pursuant to the Uniform Plumbing Code 710.3.3, which provides "In other than single-dwelling units, the ejector or pump shall be capable of passing a two (2) inch (51 mm) diameter solid ball, and the discharge piping of each ejector or pump shall have a backwater valve and gate valve, and be not less than three (3) inches (80 mm) in diameter."

FIG. 16 shows a shower heat exchanger showing an auxiliary peripheral jet flush-out system 70 with jets 71 and control valve 72, as well as an optional central divider brace 80 for stability. In this embodiment, two separate sets of serpentine water channels 37 are provided on each side of the divider brace 80 and flowing jointly into drain 40. The auxiliary flush out set of jets 71 can be provided within the space above the pair of separate heat conductive upper plates 29 and 29' of the heat exchanger 25 and a floor of the tub 11 above the heat exchanger 25.

As shown in FIG. 17, although the shower heat exchanger 25 can be retrofit and sealed to existing tub/shower stalls 11, it is further noted that the heat exchanger 25 can be built integral into a factory produced tub/shower stall modular unit 90 with liner walls 91-93 and tub 11 and/or optimal access plate 62.

Additionally, as shown in FIG. 17A, although the shower heat exchanger 25 can be retrofit and sealed to existing tub/shower stalls 11, it is further noted that the heat exchanger 25 can be built integral into a factory produced shower stall modular unit 90a with liner walls 91a-93a, but with a shower stall 11a, instead of a tub/shower stall 11 shown in FIG. 17, and/or with access plate 62a.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:
1. A shower heat exchanger system comprising:
a tub/shower stall with a single drain for draining grey waste water;
a shower in said tub/shower stall having a shower head, sources of incoming cold and hot water including cold and hot water valves with handles, respectively;
a mixing area for the incoming cold and hot water prior to delivery to said shower head;
a heat exchange system for preheating incoming cold water to said cold water valve located below said tub/shower stall;
said heat exchange system comprising a housing containing a flat plate of thermally conductive material having a gray water chamber above said flat plate within said housing, and an incoming cold water chamber below said flat plate within said housing;
said gray water chamber having an inlet through a top wall of said housing at one end adjacent said drain for receiving said gray water being discharged through said drain, and having an outlet through a wall of said housing at an opposite end of said gray water chamber discharging the gray water directly into a sewer system, said gray water spreading over a complete width and length of said flat plate in a straight and uninterrupted flow path as said gray water moves from said inlet to said outlet of said gray water chamber, said heat exchange system being a dry base structure thereby avoiding any leaking gray water from intruding into potable water;
said gray water chamber inlet, the height throughout said gray water chamber, and said gray water outlet being sufficiently large as to accommodate a ball of about two inches in diameter to accommodate a snaking cable to remove any clog, in accordance with requirements of the Uniform Plumbing Code;
said gray water chamber having means for guiding said snaking cable into the outlet of said gray water chamber to facilitate any removal of a clog;
said incoming cold water chamber having an inlet adjacent the outlet of said gray water chamber and an outlet adjacent the inlet of said gray water chamber so that flows in both chambers are countercurrent to each other;
said incoming cold water chamber having a serpentine flow pattern and being insulated from below;
whereby heat is transferred from the grey waste water spreading over said flat plate to preheat the incoming cold water flowing underneath said flat plate in contact with a bottom surface of said flat plate;
said cold water valve directing flow of said preheated incoming cold water from said incoming cold water chamber to said mixing area so that hot water from a water heater is mixed with said preheated incoming cold water in said mixing area as a substitute for the incoming cold water that would be normally plumbed to the discharge shower head,
thereby reducing the amount of hot water flow required to achieve the desired showering temperature.

2. The shower heat exchanger of claim 1 wherein said heat exchanger system is underneath said tub/shower stall at a height distance displacement of about two inches below said tub/shower stall.

3. The shower heat exchanger as in claim 1 wherein said means for guiding in said gray water chamber comprises a concave region surrounding the outlet of said gray water chamber to guide said snaking cable into said outlet of said gray water chamber.

4. The shower heat exchanger as in claim 1 wherein said flat plate of said heat exchanger system is copper.

5. The shower heat exchanger as in claim 1 wherein said flat plate is substantially horizontal with the gray water inlet end of said flat plate being slightly higher than the outlet end of said flat plate.

6. The shower heat exchanger as in claim 4 wherein said incoming cold water chamber includes a plurality of reversal flow portions, each of said reversal flow portions being about two inches in width.

7. The shower heat exchanger as in claim 1 wherein said flat plate of said heat exchanger system includes a plurality of parallel arrays of downwardly extending fins on an underside of said flat plate, thereby increasing the effective area of contact of said incoming cold water to said flat plate during preheating of said incoming cold water.

8. The shower heat exchanger as in claim 1 wherein said heat exchanger system is plumbed directly with a supply of the cold water feeding the incoming cold water valve, whereby said heat exchanger system remains at supply pressure when the shower/tub is not in use.

9. The shower heat exchanger as in claim 1 wherein said drain is located at the end of the tub opposite the shower head while the sewer connection is retained at a normal location at the shower head end of said tub, whereby said tub is turned around since the tub is reversed from normal configuration.

10. The shower heat exchanger as in claim 1 wherein the drain is retained at the shower head end of the tub, but the sewer connection is located at the opposite end of the tub.

11. The shower heat exchanger as in claim 1 wherein said heat exchanger system is downstream of said incoming cold water valve, and preheated incoming cold water from said heat exchanger system is routed directly to said mixing area, whereby said heat exchanger system is no longer pressurized when the shower is not in use in a dry base heat exchanger configuration whereby if the heat exchanger system were damaged or punctured, the heat exchanger system would not leak profusely since the heat exchanger system is not pressurized.

12. The shower heat exchanger as in claim 1 wherein a service chamber is attached to the end of the tub/shower stall adjacent to a sewer pipe connection.

13. The shower heat exchanger as in claim 12 further comprising a removable access cover located over said service chamber, wherein, when said access cover is removed, the sewer pipe connection can be seen in an unobstructed view at the bottom so that said snaking cable and/or chemical clog removers can be administered along a straight short path within said service chamber.

14. The shower heat exchanger as in claim 1 further comprising an auxiliary flusher being provided within a space above said flat plate of said heat exchanger system and a floor of the tub/shower stall above said heat exchanger system.

15. The shower heat exchanger of claim 1 wherein said serpentine flow pattern comprises channels cut into an insulated lower plate.

16. The shower heat exchanger of claim 1 wherein said serpentine flow pattern comprises a plurality of joined tubings with corner sections integrally forming a lower plate and being insulated from below.

17. The shower heat exchanger as in claim 1 wherein said heat exchanger system and said tub/shower stall are built integral in a sealed unit.

\* \* \* \* \*